United States Patent
Okada

(10) Patent No.: US 7,100,829 B2
(45) Date of Patent: Sep. 5, 2006

(54) CARD READER AND TRANSACTION PROCESSING APPARATUS

(75) Inventor: Masanobu Okada, Kyoto (JP)

(73) Assignee: Omron Corporation, Kyoto-Fu (JP)

( * ) Notice: Subject to any disclaimer, the term of this patent is extended or adjusted under 35 U.S.C. 154(b) by 0 days.

(21) Appl. No.: 10/625,654

(22) Filed: Jul. 24, 2003

(65) Prior Publication Data

US 2004/0035929 A1 Feb. 26, 2004

(30) Foreign Application Priority Data

Aug. 2, 2002 (JP) ............................. 2002-225834

(51) Int. Cl.
*G06K 7/00* (2006.01)
(52) U.S. Cl. ....................... 235/439; 235/380
(58) Field of Classification Search ................ 235/377, 235/379, 380, 435, 439, 440, 493
See application file for complete search history.

(56) References Cited

U.S. PATENT DOCUMENTS

| | | | |
|---|---|---|---|
| 4,420,751 A | | 12/1983 | Paganini et al. |
| 5,397,883 A | * | 3/1995 | Miyashita ................... 235/382 |
| 6,138,907 A | * | 10/2000 | Mori et al. ................... 235/379 |
| 6,164,538 A | * | 12/2000 | Furuya et al. ............... 235/449 |
| 6,345,760 B1 | * | 2/2002 | Eason et al. ................ 235/380 |
| 6,390,367 B1 | | 5/2002 | Doig |
| 6,422,475 B1 | | 7/2002 | May |
| 6,629,643 B1 | * | 10/2003 | Nagata et al. .............. 235/475 |
| 6,824,062 B1 | * | 11/2004 | Hirasawa .................... 235/479 |

FOREIGN PATENT DOCUMENTS

| | | |
|---|---|---|
| EP | 1 067 474 A3 | 1/2003 |
| GB | 2 351 586 A | 1/2001 |
| JP | A-8-335253 | 12/1996 |
| JP | 11153666 A * | 6/1999 |
| JP | 2000-076390 | 3/2000 |
| JP | 2000-137773 | 5/2000 |
| JP | 2001-032584 | 2/2001 |
| JP | A-2001-67525 | 3/2001 |
| JP | 2001-195663 | 7/2001 |

OTHER PUBLICATIONS

Japanese Office Action dated Nov. 1, 2005, English and Japanese versions (5 pages).

* cited by examiner

*Primary Examiner*—Thien M. Le
*Assistant Examiner*—Kumiko C. Koyama
(74) *Attorney, Agent, or Firm*—Dickstein Shapiro LLP

(57) ABSTRACT

An ultrasonic wave sensor is mounted on a card reader. A detection range of the ultrasonic wave sensor covers a front surface of an inlet. The ultrasonic wave sensor detects presence or absence of a foreign body at the time of standby until a card is inserted into a card slot. When a processing of the card is terminated and the card is discharged, the ultrasonic wave sensor detects presence or absence of the card or presence or absence of a foreign body. In the case where the ultrasonic wave sensor cannot detect the card although the card has been discharged, an abnormality signal can be output.

2 Claims, 11 Drawing Sheets

CARD READER AND TRANSACTION PROCESSING APPARATUS

BACKGROUND OF THE INVENTION

1. Field of the Invention

This invention relates to a card reader for reading information recorded on a magnetic card and an IC card. Also, the invention relates to a transaction processing apparatus using a card.

2. Description of Related Art

A card reader is an apparatus for reading information recorded on a card. Cards read by a card reader include magnetic cards, IC cards and the like.

Such a card reader is mounted on, for example, an automatic teller machine (ATM) installed in banks. Identification information of a user is recorded on a card used in ATMs. When a user inserts the card into the card reader mounted on an ATM, the card reader reads identification information recorded on the card. Subsequently, the ATM demands input of a personalized number of the user. When the user uses an input device, such as ten keys, on the ATM to input a personalized number, the ATM sends identification information read by the card reader and the personalized number input by the user to a center system of a bank. The center system performs verification of the person itself on the basis of such information. The center system refers to a user database on the basis of the received identification information, and it is determined whether the input personalized number and a personalized number registered in the database correspond to each other. Results of verification of the person itself are sent to the ATM, where the ATM begins or terminates transactions on the basis of the results of verification of the person itself. When the ATM begins transactions and receives a transaction termination signal from the center system, it returns to a user the card inserted into the card reader.

The card reader comprises a card slot being a card entrance; a card insertion detection sensor for detecting insertion of the card into the card slot; a readout head for reading information recorded on the card; a shutter for closing the card slot after the card is conveyed. When reading of card information is completed, the card slot is opened, and a card conveyance mechanism discharges the card from the card slot.

In some cases, a false card reader is mounted on a front surface of an authentic card reader making a trial for unfairly getting card information of a magnetic card. Such false card reader comprises a memory for storing read information.

When a user is not aware that such false card reader has been mounted, and inserts the card into the card reader thinking that the card reader is a part of an authentic card reader, card information of the user is read by the false card reader. Meanwhile, card information of the card having been inserted into the false card reader is read by the false card reader and conveyed to the authentic card reader, so that card information is sent to a device such as an ATM, on which the authentic card reader is mounted, and a processing is normally carried out.

When the process of reading card information is terminated, the authentic card reader discharges the card. Further, the card is returned to the user through a card slot of the false card reader. Since the card is returned in a normal manner after the termination of the processing, the user is unaware that card information has been unfairly read. Also, card information is in some cases read by the false card reader when the card is returned.

Thereafter, a person having mounted the false card reader dismounts the false card reader from the authentic card reader, and the person reads the unfairly obtained read card information from the memory to counterfeit a card on the basis of the card information.

JP-A-2001-67525 describes a card reader provided with a photosensor or a microwave sensor for the purpose of detecting a foreign body such as false card reader or the like. Also, U.S. Pat. No. 6,390,367 describes a card reader provided with a proximity sensor for attaining the same object as that described above. Further, British Publication of Patent Application No. 2351586 describes a card reader provided with a probe coil for detection of metal to attain the same object as that described above. Also, JP-A-8-335253 describes a card reader having a similar configuration to that of the inventions described in these publications, although the card reader is different in object from the inventions. The card reader comprises a magnetoresistive element mounted in the vicinity of a magnetic card insertion/discharge port, and insertion or discharge of a magnetic card is detected making use of a change in output voltage from the magnetoresistive element when the card is inserted or discharged.

Sensors described above to detect a foreign body mounted on a front surface of a card reader involve a problem that detection is not possible depending upon a material of the foreign body.

Also, a foreign body mounted on a front surface of an authentic card reader includes, in some cases, a false inlet in addition to a false card reader described in the paragraph of the prior art.

Such false inlet is constructed such that a card having been inserted into a card reader is caught in the false inlet, when the card is returned, not to be discharged. A user being not aware that the false inlet has been mounted on a front surface of the card reader inserts the card into a card slot of the false inlet. Then the card processing is terminated and a genuine card reader tries to discharge the card, but the card is not discharged since the false inlet is mounted on the front surface of the card reader. Since the card is not discharged although the card processing has been terminated, the user leaves the card reader thinking that the card reader is out of order. Thus, there is caused a problem that a person having mounted the false inlet dismounts the false card slot from the genuine card reader and steals the card left in the false inlet. Cards suffering such damage are irrespective of a type of reading such as magnetic cards, contact type IC cards, non-contact type IC cards, or optical cards.

SUMMARY OF THE INVENTION

The invention provides a card reader having a card entrance, a readout head for reading information recorded on a card inserted from the card entrance, an output circuit for outputting information read by the readout head, and a card conveyance mechanism for discharging the card, the card reader further having an ultrasonic wave sensor for detecting whether the card is present outside the card entrance when the card is discharged by the card conveyance mechanism.

Unless the card is discharged after the card conveyance mechanism is actuated in order to discharge the card, the ultrasonic wave sensor does not receive reflected waves from the card, and so it is detected that the card is not present. Provided that the card is discharged after the card conveyance mechanism is actuated in order to discharge the card, the ultrasonic wave sensor receives reflected waves from the card, and so it is detected that the card is present. Subsequently, assuming that a foreign body is mounted at the card entrance when the card is discharged by the card conveyance mechanism, a distance from the ultrasonic wave sensor to a foreign body covering the card is different from a distance from the ultrasonic wave sensor to the card. Therefore the time at which reflected waves caused by an ultrasonic wave are received is different from the time at which reflected waves are received in the case where only the card is present at the card entrance. Therefore, the ultrasonic wave sensor cannot detect when the card is normally present, and detects that a card is absent.

In the case where the card reader detects that the card is absent, the card reader outputs an alarm signal to thereby inform that dishonesty, failure, or the like is generated in the card reader.

The card reader comprises a readout head corresponding to a card reading technique. In the case where the inserted card is a magnetic card, a magnetic card reader is used. In the case where the inserted card is a contact type IC card, a contact type IC card reader is used. In the case where the inserted card is a non-contact type IC card, a non-contact type IC card reader is used. In the case where the inserted card is an optical card, an optical card reader is used.

Subsequently, assuming that a foreign body is formed from a substance, which absorbs ultrasonic waves, the ultrasonic wave sensor operates when the card conveyance mechanism discharges the card. At this time, ultrasonic waves emitted from the ultrasonic wave sensor are absorbed by the foreign body and not reflected. Therefore, the ultrasonic wave sensor does not receive reflected waves corresponding to the emitted ultrasonic waves. Reflected waves from the card should be essentially received, but such reflected waves are not received, so that the ultrasonic wave sensor detects that any card is not present. Based on this, the card reader can output an abnormality signal, and so it is found that dishonesty, or failure is generated outside the card entrance.

Also, in the case where the card conveyance mechanism does not discharge the card and a foreign body is formed from a substance, which absorbs ultrasonic waves, the ultrasonic wave sensor does not receive reflected waves. Therefore, the ultrasonic wave sensor detects that the card is not present. Based on this, an abnormality signal is output, whereby it is possible to know that dishonesty, or failure is generated outside the card entrance.

Also, a further card reader according to the invention comprises, in addition to the configuration of the above-mentioned card reader, a configuration in which the ultrasonic wave sensor further detects whether a foreign body is present outside the card entrance. At this time, a distance from the ultrasonic wave sensor to a foreign body is different from a distance from the ultrasonic wave sensor to the card. Thereby, the card reader according to the invention can detect the presence of a foreign body since the time at which the ultrasonic wave sensor receives reflected waves caused by ultrasonic wave in the case where the card is present at the card entrance, is different from the time at which reflected waves are received in the case where a foreign body is present at the card entrance. Also, since the ultrasonic wave sensor does not receive reflected waves in the case where the card is not present at the card entrance, the card reader can detect the absence of the card.

A foreign body is a body present in the vicinity of a front surface of the card entrance and does not include the card when the card is discharged. A foreign body is a general term for a body, such as a false inlet, or false card reader, which should not be attached to the front surface of the card reader.

Also, a further card reader according to the invention uses a reflection type sensor, such as a sensor for detecting a foreign body or a card, in place of the ultrasonic wave sensor.

A reflection type sensor is one for irradiating waves on an object to detect presence or absence of the object and object type according to a state in which reflected waves are received. Waves irradiated include, for example, ultrasonic waves, electromagnetic waves, visible radiation, infrared rays, ultraviolet rays, or the like. By making use of the fact that the time at which reflected waves are received, an intensity at which reflected waves are received, a quantity of reflected waves as received, and a position in which reflected waves are received vary according to a presence or absence of an object and a kind of the object, a presence or absence of an object, a distance to the object, and a kind of a material of the object are detected.

Another card reader in accordance with the invention is configured such that paths of transmission and reception of ultrasonic waves, along with which ultrasonic waves are transmitted toward a surface of a card from a transmitter of the ultrasonic wave sensor, reflected by the surface of the card and received by a receiver, are substantially parallel to a surface of the card entrance. Thereby, a foreign body around the front surface of the card entrance, or the card exposed from the card entrance is detected.

An alternative card reader in accordance with the invention has a card entrance, a readout head for reading information recorded on a card inserted from the card entrance, an output circuit for outputting information read by the readout head, and a card conveyance mechanism for discharging the card, the card reader comprising an ultrasonic wave sensor comprising a transmitter to transmit ultrasonic waves outside the card entrance and a receiver to receive reflected ultrasonic waves from a body when the body is present at the card entrance. The card reader comprises a memory for beforehand storing as a reference duration a necessary duration from a transmission of ultrasonic waves to their reception in the ultrasonic wave sensor in the case where the card is present outside the card entrance, and an abnormality determination unit which makes a comparison between a necessary duration at the time of reception of ultrasonic waves transmitted from the transmitter and when the card conveyance mechanism discharges the card and the reference duration stored in the memory, and outputs a presence or absence of an abnormality on the basis of results of the comparison.

Results of the comparison are inconsistent when the card is not discharged although the card conveyance mechanism operates to discharge the card, or when a foreign body is mounted at the card entrance. In either case, the card reader outputs generation of an abnormality.

Another card reader in accordance with the invention has a card entrance, a readout head for reading information recorded on a card inserted from the card entrance, an output circuit for outputting information read by the readout head, a card conveyance mechanism for discharging the card, and a sensor for detecting whether an object is present outside the card entrance. The sensor is configured to detect whether a foreign body is present as an object at the time of standby for card processing, and the sensor is configured to detect whether the card is present as an object when the card conveyance mechanism discharges the card.

Thereby, it is possible to detect presence or absence of an abnormality at the time of standby for card processing. Further, it is possible to detect a foreign body at the time of card discharge even if such foreign body cannot be detected at the time of standby for card processing.

Here, any sensor may be used as long as it can detect an object. Thus, the sensor may be a reflection type sensor that makes use of ultrasonic waves, electromagnetic waves, or the like, a shielding sensor, a proximity sensor, or the like. Also, a sensor for detection of the card and a sensor for detection of a foreign body may be provided separately. In this case, the sensor for detection of the card and the sensor for detection of a foreign body may be different in how an object is detected.

The card reader comprises, in addition to the configuration of the above-mentioned card reader, a configuration in which, at the time of standby for card processing, an abnormality signal is output in the case where the sensor detects the presence of a foreign body, and when the card conveyance mechanism discharges a card, an abnormality signal is output in the case where the sensor does not detect the presence of the card.

Thereby, it is possible to know that an abnormality is caused in the card reader.

Also, a transaction processing apparatus according to the invention comprises a card entrance, a readout head for reading information recorded on a card inserted from the card entrance, an output circuit for outputting information read by the readout head, a transaction processing unit for performing transaction processing on the basis of information from the output circuit, a card conveyance mechanism for discharging the card in the case where the transaction processing unit completes a transaction, and an ultrasonic wave sensor for detecting whether the card is present outside the card entrance when the card is discharged by the card conveyance mechanism.

Thereby, the transaction processing apparatus detects dishonesty, failure, or the like, against the card as used.

DESCRIPTION OF PREFERRED EMBODIMENTS

Figure 1:
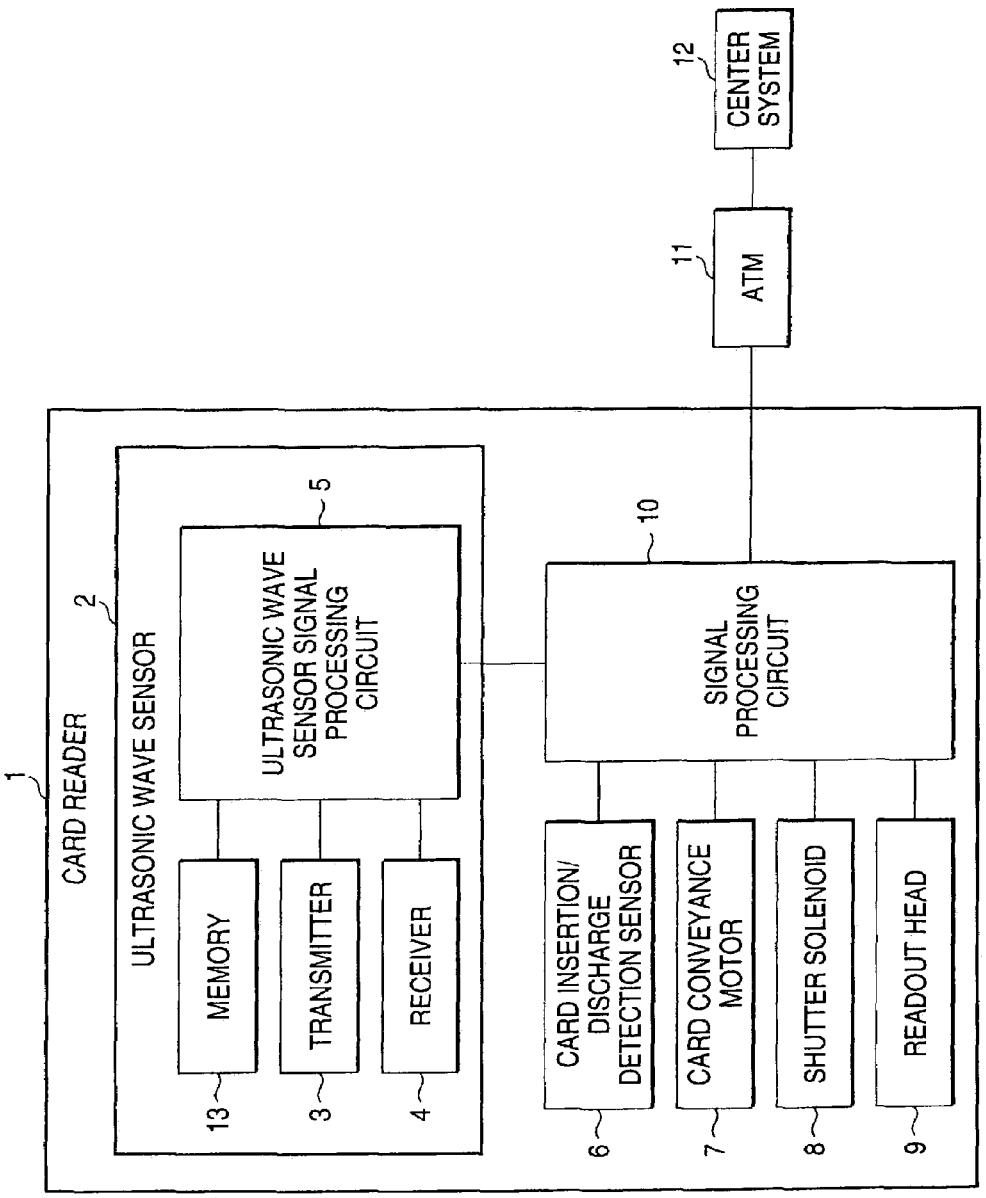
FIG. 1 is a schematic view showing flow of signals and main parts in a card reader.

An example, in which a card reader 1 is mounted on an automatic teller machine (ATM) 11, will be explained as an embodiment of the invention. First, signal processing in the card reader 1 will be explained. FIG. 1 is a schematic view showing flow of signals in parts of the card reader 1. Also, the card reader 1 is mounted on the ATM 11, and the ATM 11 is connected to a center system 12 so as to enable transmission and reception of information.

The card reader 1 is mainly composed of an ultrasonic wave sensor 2, card insertion/discharge detection sensor 6, card conveyance motor 7, shutter solenoid 8, readout head 9, and a signal processing circuit 10. Further, the ultrasonic wave sensor 2 is mainly composed of a transmitter 3, receiver 4, ultrasonic wave sensor signal processing circuit 5, and a memory 13.

The ultrasonic wave sensor 2 acts to detect presence and absence of an object. The transmitter 3 sends ultrasonic waves toward a detection region of the ultrasonic wave sensor 2, and in the case where an object is present in the detection region, ultrasonic waves sent from the transmitter 3 are reflected by the object. The receiver 4 receives reflected ultrasonic waves from an object. Meanwhile, in the case where an object is absent in the detection region, the receiver 4 does not receive reflected ultrasonic waves from an object. Thereby, the ultrasonic wave sensor signal processing circuit 5 detects a presence or absence of an object.

Meanwhile, even in the case where an object is present in the detection region, a state in which reflected waves are received varies according to a distance between the ultrasonic wave sensor 2 and the object. On the basis of such variation, the ultrasonic wave sensor signal processing circuit 5 identifies the object. Since the kinds of cards used in the card reader are known beforehand, a necessary time is measured from that time at which ultrasonic waves are sent from the transmitter 3 to that time after the ultrasonic waves are reflected by an object at which the receiver receives the reflected waves. The memory 13 stores the measured necessary time as reference time. Consequently, in the case where the ultrasonic wave sensor 2 has measured a foreign body, a different necessary time from the reference time stored in the memory 13 is obtained. Thereby, the ultrasonic wave sensor 2 discriminates between a card and a foreign body. Thereby, in the case where a foreign body different from the card is present in the detection region, the ultrasonic wave sensor 2 detects presence of such foreign body.

The ultrasonic wave sensor 2 begins its operation on the basis of a measurement start signal from the signal processing circuit 10. Then the ultrasonic wave sensor 2 sends results of detection to the signal processing circuit 10.

The card insertion/discharge detection sensor 6 detects insertion of the card into a card slot of the card reader 1 and sends a signal to the signal processing circuit 10 to that effect.

In the case where the card insertion/discharge detection sensor 6 detects insertion of the card into a card slot that is an entrance for a card, the signal processing circuit 10 sends a control signal for conveyance, to the card conveyance motor 7 in order that the inserted card be conveyed to an interior of the card reader 1. Then, the card conveyance motor 7 rotates card conveyance rollers, which define a card conveyance path. When a user inserts the card up to a position of leading rollers, rotation of the rollers causes the card to be conveyed into interior of the card reader 1. And when conveyance of the card causes the card insertion/discharge detection sensor 6 to detect passage of the card through a detection position of the card insertion/discharge detection sensor 6, the signal processing circuit 10 sends a control signal for closing of a shutter of the card slot, to the shutter solenoid 8. The shutter solenoid 8 drives the shutter to close the card slot of the card reader 1. Then, the readout head 9 reads information recorded on the card. And when the readout head 9 reads card information, it sends the information to the signal processing circuit 10.

The signal processing circuit 10 sends the read card information to the ATM 11. The ATM 11 performs cash transaction processing on the basis of the card information. Cards used in the ATM 11 record identification information of users. In order to confirm whether the identification information is proper, the ATM 11 sends the identification information to the center system 12. The center system determines on the basis of a database whether the identification information received from the ATM 11 is proper. The center system 12 sends results of determination to the ATM 11. In the case where it is determined that the identification information is proper, the ATM 11 performs cash transaction processing on the basis of instructions from a user. When the cash transaction processing is terminated, the ATM 11 commands the card reader 1 to return to a user the card in the card reader. Also, in the case where it is determined that the identification information is not proper, the ATM 11 displays on the display of the ATM 11 that the cash transaction processing is suspended.

When the cash transaction processing in the ATM 11 is terminated or suspended, the ATM 11 sends a card return command to the card reader 1. Then, the signal processing circuit 10 sends to the shutter solenoid 8 a signal to the effect that the shutter of the card slot should be opened. Then, the shutter solenoid 8 actuates the shutter to open the card slot, and the signal processing circuit 10 sends to the card conveyance motor 7 a signal to the effect that the card should be discharged. Then, the card conveyance motor 7 reverses the rollers to discharge the card, and the card insertion/discharge detection sensor 6 detects the card being discharged from the conveyance path of the card reader 1.

When the card insertion/discharge detection sensor 6 detects the card being discharged from the conveyance path, the ultrasonic wave sensor 2 begins a detection operation. When the ultrasonic wave sensor 2 detects only the card, it sends to a signal processing unit to that effect, and when the card insertion/discharge detection sensor detects that a user has drawn out the card from the card slot, the card reader 1 closes the card slot for normal termination.

When the ultrasonic wave sensor 2 detects a foreign body or the card is not detected after the card conveyance motor 7 reverses the rollers to perform a processing for discharging the card, it sends a signal to the signal processing circuit 10 to that effect. The signal processing circuit 10 sends to the shutter solenoid 8 a signal to the effect that the shutter should be closed, and the shutter solenoid 8 actuates the shutter to close the card slot. An abnormality is then generated by the signal processing circuit 10 which is then sent to the ATM 11. When receiving an abnormality generation signal from the card reader 1, the ATM 11 suspends the cash transaction processing.

Figure 2:
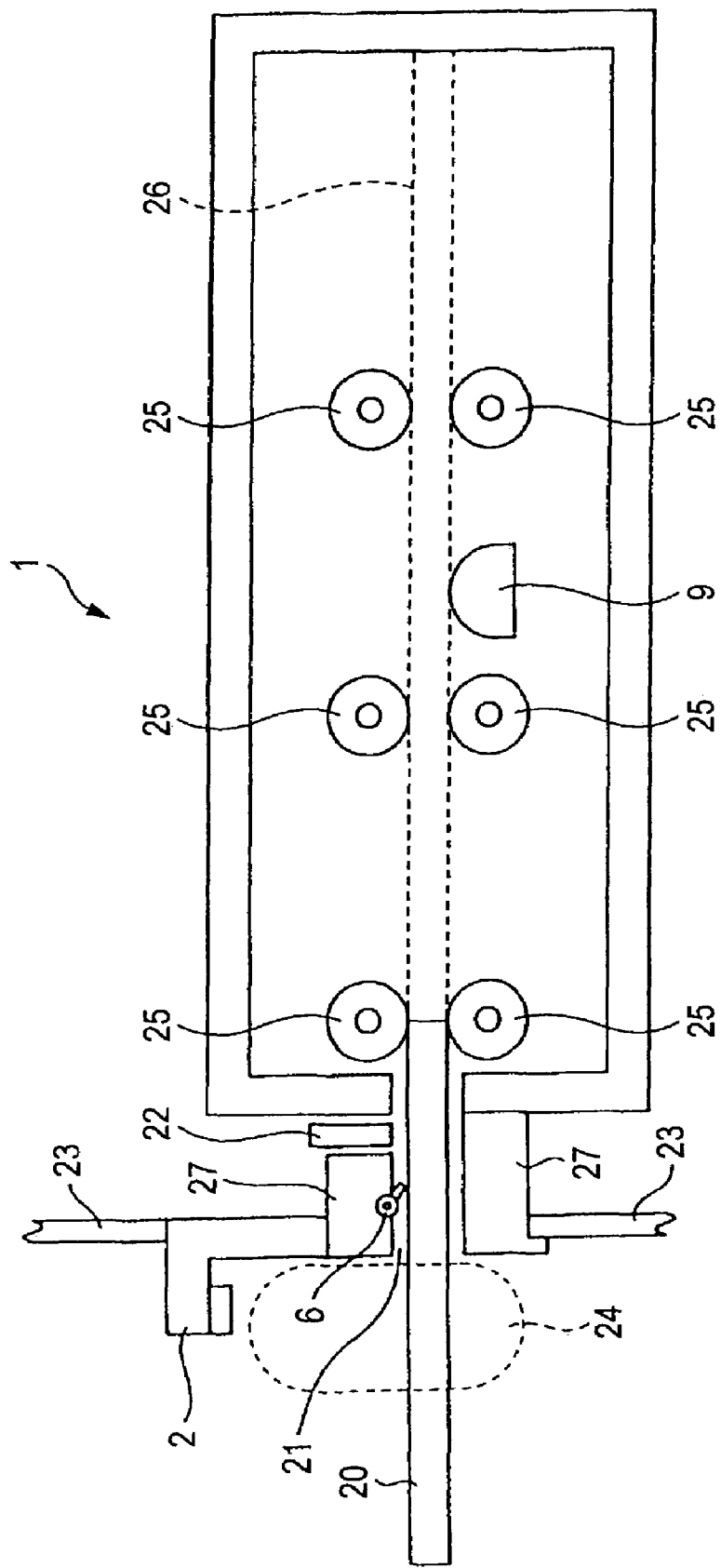
FIG. 2 is a schematic, cross sectional view showing a card slot of the card reader mounted on an automatic teller machine and a conveyance path.

Subsequently, an explanation will be given of mechanical motions of the card reader 1. FIG. 2 is a schematic, cross sectional view showing a card slot 21 of the card reader 1 mounted on the ATM 11 and a conveyance path 26.

The card slot 21 is an entrance and exit for a card 20. The card 20 is inserted into the card reader 1 from the card slot 21 provided at an inlet 27. A detection range 24 for the ultrasonic wave sensor 2 is set outside the card slot 21. Thereby, the ultrasonic wave sensor 2 detects whether the card 20 discharged from the card slot 21 is present, or whether a foreign body is present, mounted on a front surface of the inlet 27.

The card slot 21 serves as an insertion port and a discharge port in the card reader 1 for the card 20. Card slot 21 is exposed from a part of an outer wall 23 of the ATM 11.

A user of the ATM 11 inserts the card 20 into the card slot 21. Then the card insertion/discharge detection sensor 6 detects the inserted card 20. Here, a microswitch is used as the card insertion/discharge detection sensor 6. Also, an optical sensor may be used as the card insertion/discharge detection sensor 6. When the card insertion/discharge detection sensor 6 detects insertion of the card 20, the card conveyance motor 7 is actuated to rotate so that the rollers 25 take the card 20 into the card reader 1.

FIG. 2 shows a state of the card reader 1 when the card 20 is inserted. Therefore, the switch of the card insertion/discharge detection sensor 6 is pushed by the inserted card 20 toward a side of insertion (rightward in FIG. 2).

A plurality of the rollers 25 are provided to define the conveyance path 26 within the card reader 1. When the inserted card 20 reaches the leading rollers 25 positioned in a left end in FIG. 2, rotation of the rollers 25 causes the card 20 to be conveyed rightward in the conveyance path 26. Then the readout head 9 reads card information.

In the case where the card 20 is a magnetic card, a magnetic head is used for the readout head 9. While the rollers 25 convey the card 20, the magnetic head comes into contact with a magnetic stripe on the magnetic card to read card information.

In the case where the card 20 is a contact type IC card, an IC contact is used for the readout head 9. When the contact type IC card is conveyed to a predetermined position by means of the rollers 25, the IC contact comes into contact with a contact on the IC card to read card information.

In the case where the card 20 is a non-contact type IC card, an antenna is used for the readout head 9. When the non-contact type IC card is conveyed to a predetermined position by means of the rollers 25, the antenna is connected electrically to an antenna of the IC card to read card information.

Also, there may be adopted a configuration in which the readout head 9 writes predetermined information on the card 20 in response to information sent from the ATM 11. This configuration includes high-order equipment for the card reader 1.

Meanwhile, when the card insertion/discharge detection sensor 6 detects termination of insertion of the card 20, it sends a signal to the shutter solenoid 8 to actuate the shutter 22 to close the card slot 21. Thereby, a wrongful act on the card and the card reader is prevented while card information is read.

When a processing termination signal is received from the ATM 11, the rollers 25 are reversed to discharge the card 20. When the card 20 reaches a position of the card insertion/discharge detection sensor 6 (which can also include a sensor inside shutter 22), the card insertion/discharge detection sensor 6 detects that the card 20 has been discharged, and the sensor sends a signal to the shutter solenoid 8 to actuate the shutter 22 to open the card slot 21. Then the card 20 is discharged from the card slot 21 by the rollers 25. Based on the fact that the card insertion/discharge detection sensor 6 detects that the card has been discharged, the ultrasonic wave sensor 2 is actuated. After the discharge processing of the card 20, the ultrasonic wave sensor 2 determines whether the discharged card 20 is present. Also, after the discharge processing of the card 20, the ultrasonic wave sensor 2 determines whether a foreign body is present, mounted on the front surface of the card reader 1.

Subsequently, a user draws out the discharged card 20 from the card slot 21, and the card insertion/discharge detection sensor 6 detects that the card 20 has been drawn out from the card slot 21. Based on such detection, the shutter solenoid 8 sends an operation signal, so that the shutter 22 is actuated to close the card slot 21.

Meanwhile, while the card insertion/discharge detection sensor 6 does not detect insertion of the card 20, the ultrasonic wave sensor 2 detects whether a foreign body is mounted on the front surface of the card reader 1. At this time, when the ultrasonic wave sensor 2 does not receive reflected waves, it detects a normal state. Also, when the ultrasonic wave sensor 2 receives reflected waves, it detects an abnormal state, such as a state, in which a foreign body is mounted on the front surface of the card reader 1.

Figure 3:
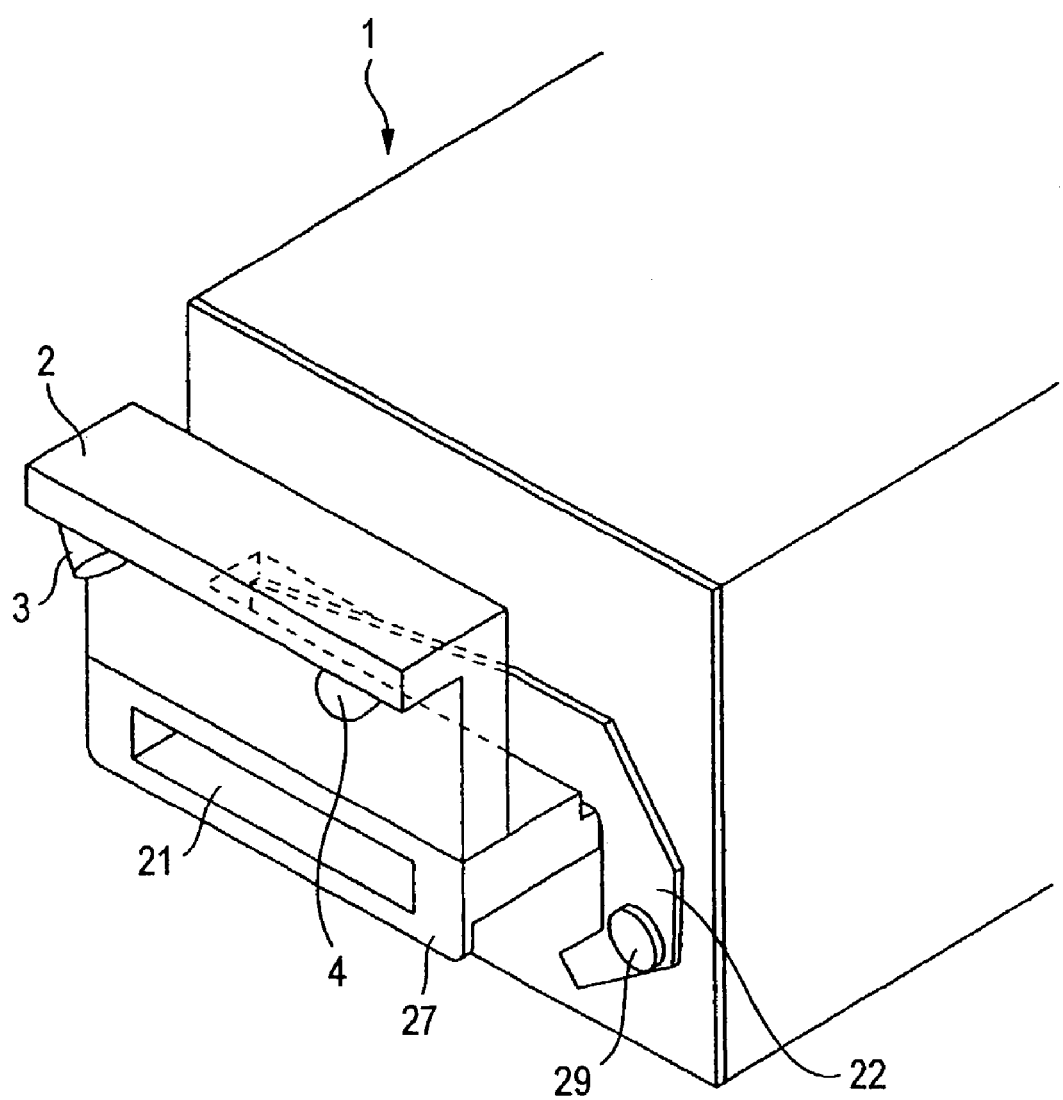
FIG. 3 is a perspective view showing the card reader.

FIG. 3 is a perspective view showing the card reader 1. The inlet 27 is provided in the front of the card reader 1. Provided centrally of the inlet 27 is the card slot 21 for insertion or discharge of the card 20.

The ultrasonic wave sensor 2 is mounted above the inlet 27. Since the sensor is mounted above the inlet, contaminants such as dust are prevented from attaching to the transmitter 3 and the receiver 4 of the ultrasonic wave sensor 2. Also, in order to detect the card 20 discharged from the card slot 21 of the inlet 27 and a foreign body mounted on the front surface of the inlet 27, the transmitter 3 and the receiver 4 are mounted to protrude from the front surface of the inlet 27.

The shutter 22 is turned about a rotating shaft 29 to be moved vertically relative to the inlet 27. The shutter 22 is moved upwardly whereby the card slot 21 is opened. The shutter 22 is moved downward toward the inlet 27 whereby the card slot 21 is closed.

Figure 4:
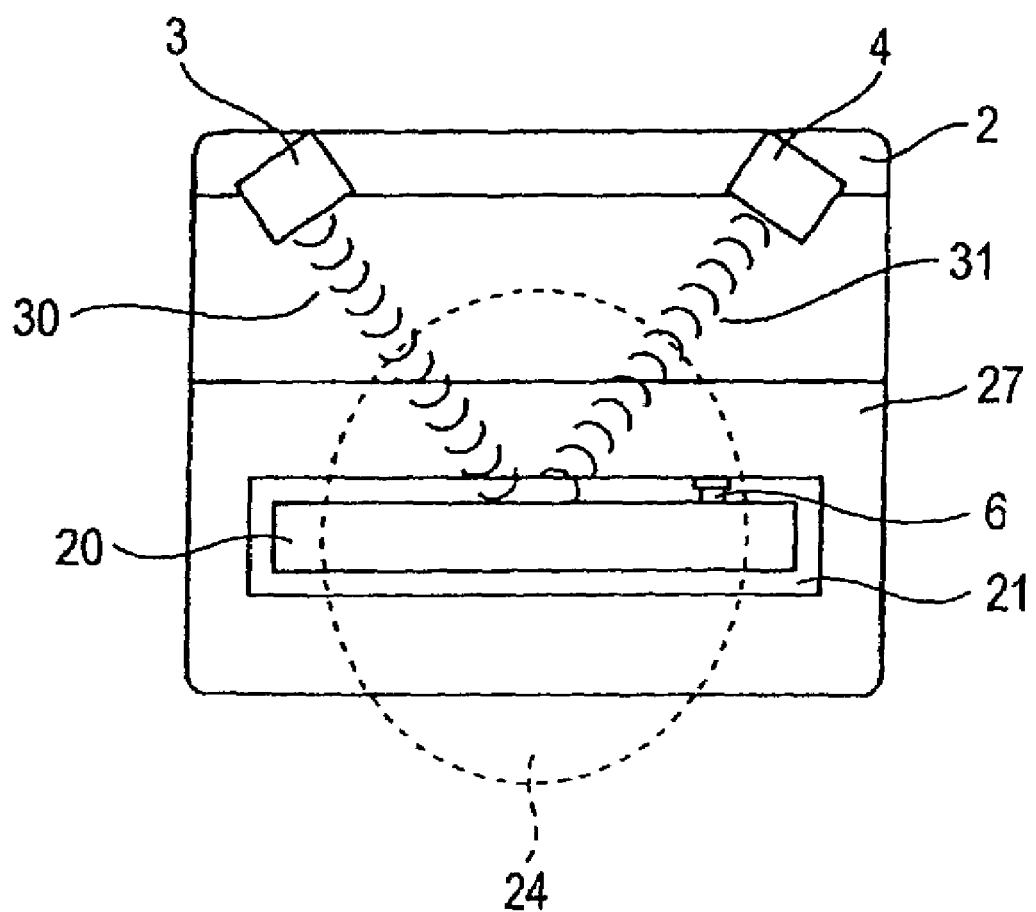
FIG. 4 is a view showing a front surface of the card reader to visualize a state in which a transmitter of an ultrasonic wave sensor of the card reader sends ultrasonic waves toward a card and a receiver receives ultrasonic waves reflected from the card.

Subsequently, an explanation will be given of the principle of detection in the ultrasonic wave sensor 2. FIG. 4 is a front view as viewed from an opened surface of the card slot 21 on the card reader 1. The card 20 is present in the card slot 21. The ultrasonic wave sensor 2 is mounted above the inlet 27. The transmitter 3 is mounted upwardly leftward and the receiver 4 is mounted upwardly rightward. The transmitter 3 emits ultrasonic waves 30 toward the detection range 24, which covers a periphery on the front surface of the card slot 21. The emitted ultrasonic waves 30 are reflected by the card 20. The receiver 4 receives reflected ultrasonic waves 31 from the card 20.

A direction of transmission of the transmitter 3 and a direction of reception of the receiver 4 are arranged in parallel to the opened surface of the card slot 21. In FIG. 2, the transmitter 3 and the receiver 4 are displaced perpendicularly to a surface of the card 20 from the ultrasonic wave sensor 2.

Also, in FIG. 4, a direction of transmission of the transmitter 3 is arranged to effect transmission obliquely relative to the surface of the card 20. A direction of reception of the receiver 4 is arranged to effect reception obliquely from the surface of the card 20.

In the case where the card 20 is present outside the card slot 21 as in FIG. 2, a duration is measured beforehand from when ultrasonic waves 30 are emitted from the transmitter 3 and reflected by the card 20 until the reflected ultrasonic waves 31 are received by the receiver 4. The ultrasonic wave sensor 2 stores in the memory 13 the measured duration as a reference duration. Then, the ultrasonic wave sensor 2 measures a duration elapsed from when ultrasonic waves 30 are emitted from the transmitter 3 until reflected ultrasonic waves 31 are received, and the measured duration is compared with the reference duration stored in the memory 13. When such comparison determines that both durations are approximately equal, it is detected that the card 20 is present. In the case where the card 20 and a foreign body are absent, the receiver 4 of the ultrasonic wave sensor 2 does not receive reflected ultrasonic waves 31, and so it is detected that the card 20 is absent.

Figure 5:
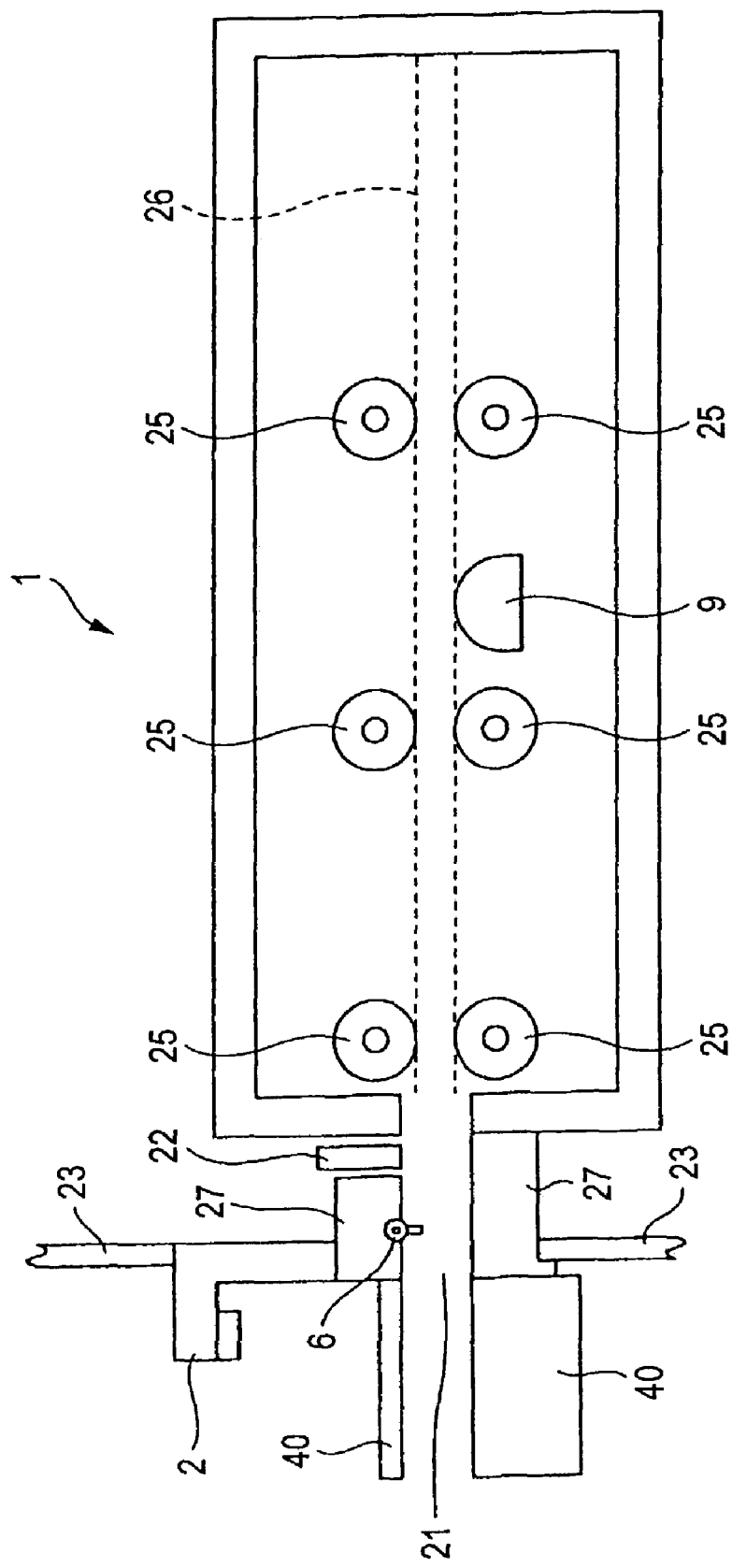
FIG. 5 is a cross sectional view showing the card reader when a card is not present in the card slot.
Figure 6:
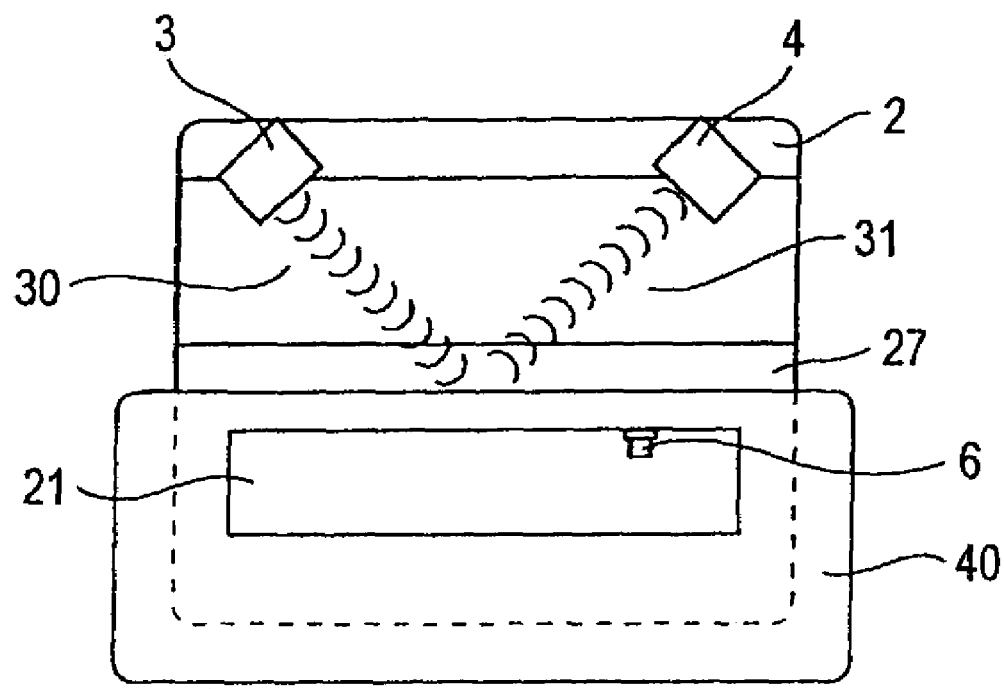
FIG. 6 is a front view showing the card reader when a card is not present in the card slot.

FIG. 5 is a schematic, cross sectional view showing the card reader 1 in a state in which card 20 is not present in the card slot 21, and a foreign body 40 such as a false card reader is mounted on the front surface of the inlet 27. FIG. 6 is a front view as viewed from the opened surface of the card slot 21 with the false card reader. The foreign body 40 is shaped to surround the card 20. In this case, since the foreign body 40 is present below the ultrasonic wave sensor 2, the ultrasonic wave sensor 2 receives reflected ultrasonic waves 31 from the foreign body 40.

Therefore, a path along which ultrasonic waves 30 are emitted from the ultrasonic wave sensor 2, reflected by the foreign body 40 and received, is short as compared with a path for the card 20. Therefore, a duration elapsed until reflected ultrasonic waves 31 are received when ultrasonic waves 30 are emitted toward the foreign body 40 is shorter than the reference duration (duration for the card 20), which is stored in the memory 13. Accordingly, based on a difference between the reference duration and a duration in the case where reflected ultrasonic waves from the foreign body 40 are received, the ultrasonic wave sensor 2 detects that the foreign body 40 is mounted on the front surface of the card slot 21.

If the foreign body 40 were formed from a substance, which absorbs ultrasonic waves 30 and does not reflect ultrasonic waves 30, only using the ultrasonic wave sensor 2 would not detect the presence of the foreign body 40.

However, the ultrasonic wave sensor 2 operates after the discharge processing of the card 20; therefore, even if the foreign body 40 absorbed ultrasonic waves 30 and the ultrasonic wave sensor 2 did not detect the card 20, the card reader 1 would detect generation of abnormality since the card 20 was not discharged from the card slot 21 at the time of the discharge processing of the card. That is, in the case where the card 20 is not detected outside the card slot 21 after the discharge processing of the card, the card reader 1 outputs a signal indicating an abnormality.

A foreign body mounted on the front surface of the inlet 27 may have a smaller thickness above a position of the card slot 21. In this case, a necessary duration elapsed until ultrasonic waves 30 are received since the waves are emitted by the ultrasonic wave sensor 2 is approximately equal to the reference duration stored in the memory 13, and so there is caused a situation, in which distinction cannot be made according to detection accuracy of the ultrasonic wave sensor 2. In this case, when the card 20 is discharged, it is possible to discriminate between the card 20 being discharged and a foreign body of small thickness being mounted on the inlet 27, which would otherwise cause the card reader 1 to erroneously detect that the card 20 is present.

At the time of standby for the processing of the card, that is, when the card is not inserted, the card reader 1 periodically detects whether a foreign body is present on the front surface of the inlet 27. Therefore, a foreign body is detected in the case in which a foreign body of small thickness is mounted on the inlet 27.

Figure 7:
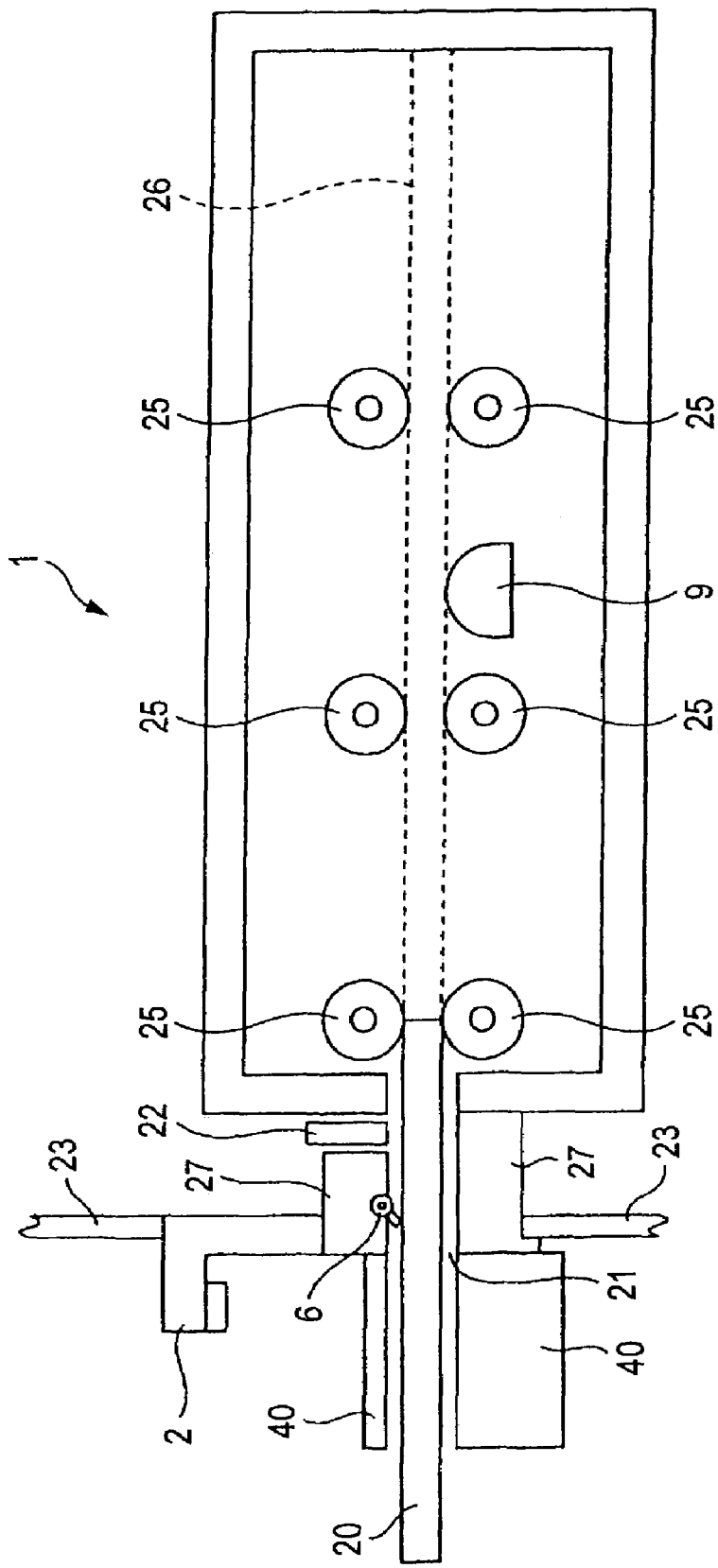
FIG. 7 is a cross sectional view showing the card reader when a card is present outside the card slot and a foreign body is mounted on the card slot.
Figure 8:
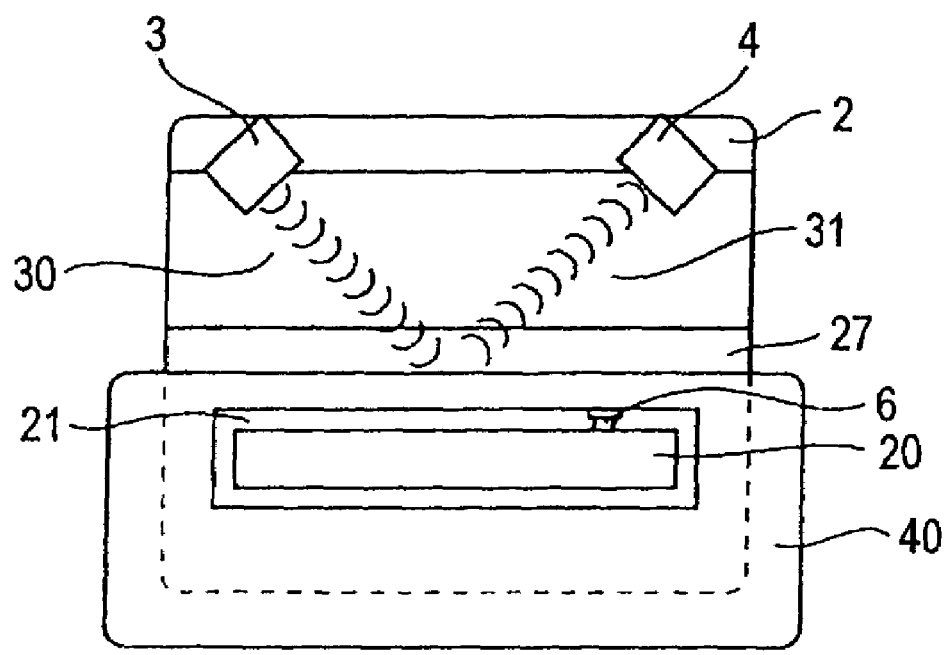
FIG. 8 a front view showing the card reader when a card is present outside the card slot and a foreign body is mounted on the card slot.

FIG. 7 is a schematic, cross sectional view showing the card reader 1 in a state in which the card 20 is present outside the card slot 21, and a foreign body 40 such as a false card reader is mounted. FIG. 8 is a front view as viewed from the opened surface of the card slot 21 at that time. In this case, since the foreign body 40 is present below the ultrasonic wave sensor 2, the ultrasonic wave sensor 2 receives reflected ultrasonic waves 31 from the foreign body 40. The ultrasonic wave sensor 2 does not receive reflected waves 31 from the card 20. Therefore, like the case, shown in FIG. 5, where no card is present in the card slot 21, and a foreign body 40 such as a false card reader is mounted, the ultrasonic wave sensor 2 detects that the foreign body 40 is mounted on the front surface of the card slot 21.

Also, even when the ultrasonic wave sensor 2 receives reflected waves 31 from the card 20, feature quantities such as time of receipt and waveform of a received signal, are different as compared with time of receipt of reflected waves 31 only from the card 20, or the like, since a major part of reflected waves 31 is composed of reflected waves 31 from the foreign body 40. Therefore, the ultrasonic wave sensor 2 can detect that the foreign body 40 has been mounted on the front surface of the card slot 21.

If the foreign body 40 is made of a material that absorbs ultrasonic waves 30, the ultrasonic wave sensor 2 detects abnormality such as the foreign body 40 having been mounted on the front surface of the card reader 1, or the like, since the ultrasonic wave sensor 2 does not receive reflected waves 31 from the card 20 at the time of card discharge.

In addition, FIG. 7 is a schematic, cross sectional view showing the card reader 1 in the case where the card 20 is discharged. Thus, the switch of the card insertion/discharge detection sensor 6 is pushed by the card 20 being discharged to fall toward a side of discharge (leftward in FIG. 7).

Figure 9:
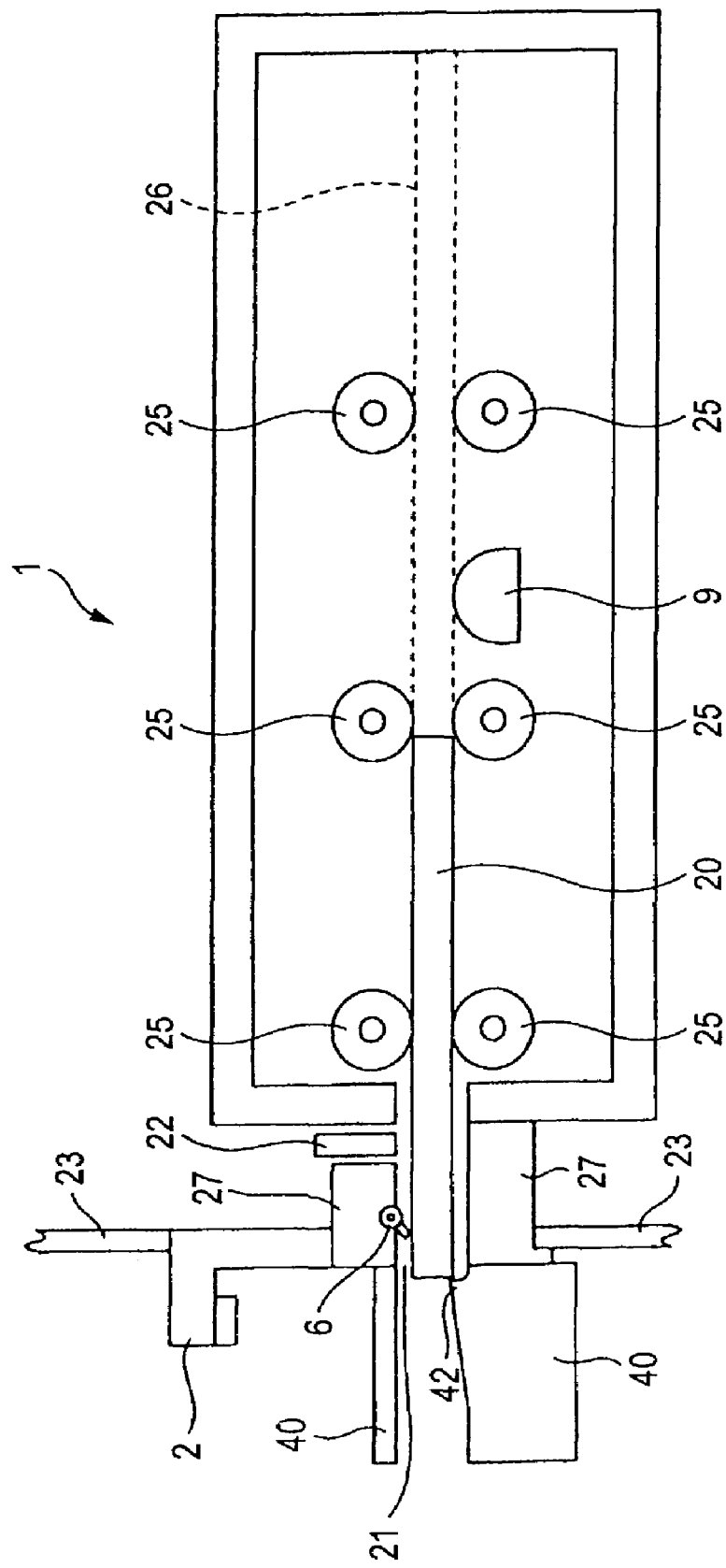
FIG. 9 is a cross sectional view showing the card reader when a card is present inside the card slot and a foreign body is mounted on the card slot.
Figure 10:
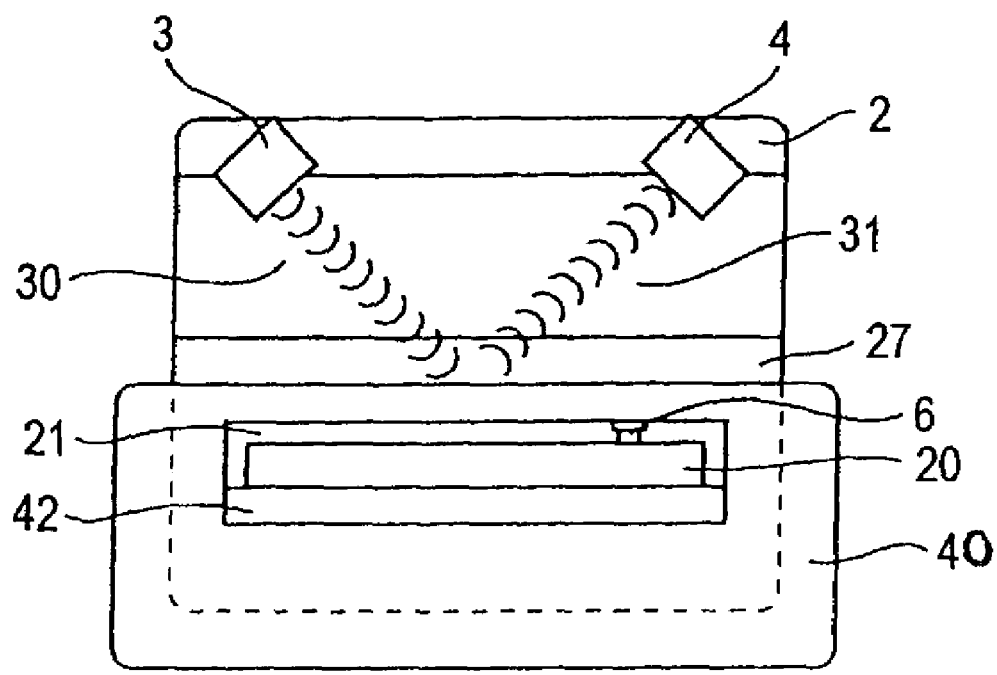
FIG. 10 a front view showing the card reader when a card is present inside the card slot and a foreign body is mounted on the card slot.

FIG. 9 is a schematic, cross sectional view showing the card reader 1 in a state in which the card 20 is present in the card slot 21, and the card 20 is not exposed outside due to the presence of a foreign body 40. FIG. 10 is a front view showing the card slot 21 at that time. The card 20 was inserted into the card slot 21 of the card reader 1 from a card slot of the foreign body 40, where the card 20 was subjected to a reading and processing, and the rollers 25 tried to discharge the card 20. Since a pawl 42 is present in the card slot of the foreign body 40, the card 20 was not discharged. In this case, since the foreign body 40 is present below the ultrasonic wave sensor 2, the ultrasonic wave sensor 2 detects that the foreign body 40 has been mounted on the front surface of the card slot 21.

If the foreign body 40 were formed from a substance that absorbs ultrasonic waves 30 and does not reflect ultrasonic waves 30, the ultrasonic wave sensor 2 could not detect the presence of the foreign body 40.

However, the ultrasonic wave sensor 2 operates after the discharge processing of the card 20. Therefore, even if the foreign body 40 absorbed ultrasonic waves 30 and the ultrasonic wave sensor 2 did not detect the card 20, the card reader 1 would detect generation of abnormality since the card 20 was not discharged at the time of the discharge processing of the card. That is, in the case where the card 20 is not detected outside the card slot 21 after the discharge processing of the card, the card reader 1 outputs generation of abnormality.

Figure 11:
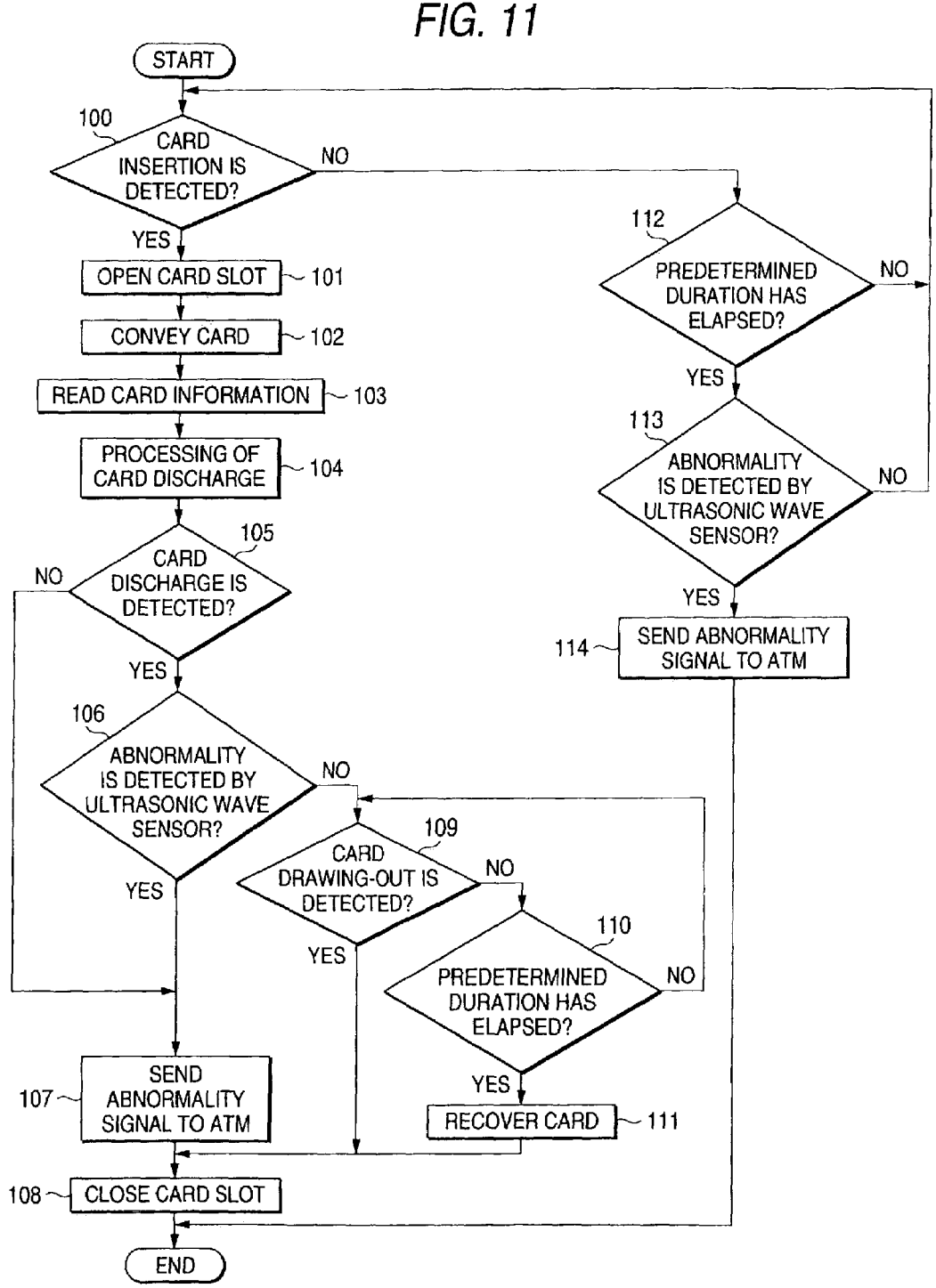
FIG. 11 is a flowchart illustrating processing such as carrying-in, reading, and discharge of a card, or detection of a foreign body, in the card reader.

Subsequently, an explanation will be given to the flow of processing relating to the card reader 1. FIG. 11 is a flowchart illustrating processings such as carrying-in, reading, and discharge of the card 20, or detection of a foreign body, in the card reader 1.

First, in accordance with a command from the ATM 11, the card reader 1 begins processing. The card reader 1 repeats processing subsequent to STEP 100 until a processing stop command from the ATM 11 is received. In an initial state, the shutter 22 is pulled down and the card slot 21 is closed. In STEP 100, the card insertion/discharge detection sensor 6 detects whether the card 20 is inserted into the card slot 21.

In the case where the card insertion/discharge detection sensor 6 detects in STEP 100 that the card 20 has been inserted into the card slot 21, the shutter 22 is actuated in STEP 101 to open the card slot 21.

In the case where the card insertion/discharge detection sensor 6 detects that the card 20 has been inserted into the card slot 21, the card conveyance motor 7 is actuated to rotate the rollers 25 in STEP 102. When the card 20 is further inserted to reach a position of the rollers, the rollers 25 convey the card 20. Thereby, the card reader 1 takes the card 20 thereinto and the readout head 9 reads card information of the card 20 in STEP 103.

Meanwhile, in the case where the card insertion/discharge detection sensor 6 detects that insertion of the card 20 has been completed, the shutter 22 is actuated to close the card slot 21. By closing the card slot 21, a wrongful act on the card 20 during reading of card information is prevented.

When reading of card information is completed, the rollers 25 are reversed in STEP 104 to convey the card 20 for discharge. The card insertion/discharge detection sensor 6 detects discharge of the card 20 in STEP 105 and the shutter 22 is actuated to open the card slot 21. Then the card 20 is discharged from the card slot 21. In STEP 106, the ultrasonic wave sensor 2 operates.

In the case where the ultrasonic wave sensor 2 detects in STEP 106 that the discharged card 20 is present outside the card slot 21, the card insertion/discharge detection sensor 6 detects in STEP 109 whether a user has drawn out the card 20.

In the case where it is detected in STEP 109 that a user has drawn out the card, the shutter 22 is actuated in STEP 108 to close the card slot to terminate the processing. Then the processing is returned to STEP 100 to detect whether a foreign body is present on the front surface of the card reader 1 until the card 20 is inserted into the card slot 21 (STEPs 100, 112, 113).

In the case where it is not detected in STEP 109 that a user has drawn out the card 20, it is determined in STEP 110 whether a predetermined duration (for example, 1 min) has elapsed since a point of time when the card 20 is discharged. In the case where it is determined that the predetermined duration has elapsed, it is deemed that a user has left the ATM 11 and is not intended to receive the card, and the rollers 25 are rotated in STEP 111 to recover the card 20. In this case, the recovered card 20 is stored in a recovery box connected to the card reader 1.

In the case where it is determined in STEP 110 that the predetermined duration has not elapsed, the card insertion/discharge detection sensor 6 detects in STEP 109 whether the card has been drawn out.

In the case where the ultrasonic wave sensor 2 detects a foreign body 40 or does not detect the card 20 in STEP 106, it is meant thereby that dishonesty or failure has been caused in the card reader 1, and then the card reader 1 sends an abnormality signal to the ATM 11 in STEP 107. The ATM 11 terminates a further cash transaction processing on the basis of such abnormality signal.

The card reader 1 actuates the shutter 22 in STEP 108 to close the card slot 21 in order to prevent further insertion of the card 20.

In the case where the card insertion/discharge detection sensor 6 does not detect in STEP 105 discharge of the card, it is meant thereby that the card 20 is caught within the card reader 1, and so the processing proceeds to STEP 107 to send an abnormality signal to the ATM 11, and the card slot 21 is closed in STEP 108.

By detecting the card 20 or a foreign body 40 at the time of discharge of the card, it is possible to detect an abnormality such as dishonesty, in which a false card and a foreign body such as a false inlet are present, or failure, in which the card is not discharged.

In the case where a foreign body is formed from a substance, which absorbs ultrasonic waves, the presence of the foreign body cannot be detected since the ultrasonic wave sensor 2 alone cannot receive reflected waves from the foreign body. However, by emitting ultrasonic waves at the time of discharge of the card, the ultrasonic wave sensor 2 receives reflected waves 31 from the card 20 in a normal state. In the case where a foreign body 40 absorbs ultrasonic waves, the ultrasonic wave sensor 2 does not receive reflected waves 31, and an abnormality is generated in the card reader 1. Therefore, the ultrasonic wave sensor 2 can detect an abnormality without depending upon a material of the foreign body 40.

Subsequently, an explanation will be given to a processing at the time of standby for insertion of the card into the card slot 21.

In the case where the card insertion/discharge detection sensor 6 does not detect insertion of the card 20 in STEP 100, it is determined in STEP 112 whether a predetermined duration (for example, 1 min) has elapsed in a timer. When 1 min or more has not elapsed in the timer, the procedure is returned to the insertion detection processing of the card 20 in STEP 100. When 1 min has elapsed in the timer, the timer is returned to an initial state to be actuated again. The procedure proceeds to STEP 113 to actuate the ultrasonic wave sensor 2.

In the case where the ultrasonic wave sensor 2 does not detect any foreign body 40 in STEP 113, the procedure is returned to the insertion detection processing of the card 20 in STEP 100. In the case where the ultrasonic wave sensor 2 detects a foreign body 40, it is meant thereby that dishonesty, in which a foreign body such as a false card reader is mounted on the front surface of the inlet 27, is committed, and so an abnormality signal is sent in STEP 114 to the ATM 11 to terminate the processing.

While an ultrasonic wave sensor is used as a sensor for detecting the card and a foreign body in the embodiment of the invention, a reflection type sensor such as radio sensor or optical sensor can also be used, and a sensor adopting any principle of detection will do.

Also, a sensor for detecting the discharged card 20 and a sensor for detecting a foreign body 40 mounted on the front surface of the card reader 1 may be provided respectively.

What is claimed as new and desired to be protected by Letters Patent of the United States is:

1. A card reader comprising:
   a card entrance;
   a readout head for reading information recorded on a card inserted at the card entrance;
   an output circuit for outputting information read by the readout head;
   a card conveyance mechanism for discharging the card;
   an ultrasonic wave sensor comprising a transmitter to transmit ultrasonic waves outside the card entrance and a receiver to receive reflected waves of ultrasonic waves from a body when the body is present at the card entrance;
   a memory for storing as a reference duration a necessary duration from transmission of ultrasonic waves to reception in the case where a card is present outside the card entrance; and
   an abnormality determination unit to make a comparison between said necessary duration at the time of reception of ultrasonic waves transmitted from the transmitter when the card conveyance mechanism discharges the card and the reference duration stored in the memory, and to output presence or absence of an abnormality on the basis of results of the comparison.

2. A transaction processing apparatus comprising:
   a card entrance;
   a readout head for reading information recorded on a card inserted at the card entrance;
   an output circuit for outputting information read by the readout head;
   a transaction processing unit for performing a transaction processing on the basis of information from the output circuit;
   a card conveyance mechanism for discharging the card when the transaction processing unit completes a transaction; and
   an ultrasonic wave sensor for detecting whether the card is present outside the card entrance when the card is discharged by the card conveyance mechanism, said ultrasonic wave sensor comprises a transmitter for transmitting an ultrasonic signal, a receiver for receiving a reflection signal of said ultrasonic signal, a reference duration memory and an ultrasonic wave sensor signal processing circuit which uses said reflection signal and information in said memory to determine if said card is outside said card entrance.

* * * * *